United States Patent
Mitsuhashi et al.

(10) Patent No.: US 9,231,272 B2
(45) Date of Patent: Jan. 5, 2016

(54) ELECTRODE AND METHOD FOR PRODUCING THE SAME

(75) Inventors: Hiroyuki Mitsuhashi, Kyoto (JP); Tsugihiro Doi, Kyoto (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 107 days.

(21) Appl. No.: 13/407,245

(22) Filed: Feb. 28, 2012

(65) Prior Publication Data

US 2012/0237821 A1    Sep. 20, 2012

(30) Foreign Application Priority Data

Mar. 18, 2011    (WO) .................. PCT/JP2011/056568

(51) Int. Cl.
*H01M 4/02* (2006.01)
*H01M 10/0525* (2010.01)
*H01M 4/04* (2006.01)
*H01M 4/133* (2010.01)
*H01M 4/1393* (2010.01)
(Continued)

(52) U.S. Cl.
CPC ........ *H01M 10/0525* (2013.01); *H01M 4/0404* (2013.01); *H01M 4/133* (2013.01); *H01M 4/1393* (2013.01); *H01M 4/587* (2013.01); *H01M 4/622* (2013.01); *H01M 2004/021* (2013.01); *H01M 2004/027* (2013.01); *Y02E 60/122* (2013.01); *Y10T 29/49108* (2015.01)

(58) Field of Classification Search
CPC . H01M 4/0409; H01M 4/043; H01M 4/0435; H01M 4/133; H01M 4/1393; H01M 10/0525; H01M 2004/021; Y10T 29/49108
See application file for complete search history.

(56) References Cited

U.S. PATENT DOCUMENTS

| 5,616,366 A | * | 4/1997 | Olsen et al. ................... 427/508 |
| 2005/0129838 A1 | | 6/2005 | Naarmann et al. |

(Continued)

FOREIGN PATENT DOCUMENTS

| DE | 10314826 A1 | 10/2004 |
| GB | 2412484 A | 9/2005 |

(Continued)

OTHER PUBLICATIONS

Extended European Search Report for European Application No. 12001440.2, dated Jul. 3, 2012.

(Continued)

*Primary Examiner* — Ula C Ruddock
*Assistant Examiner* — Lisa S Park
(74) *Attorney, Agent, or Firm* — Birch, Stewart, Kolasch & Birch, LLP

(57) ABSTRACT

The electrode of the present invention includes a current collector and an active material-containing layer formed on one side or both sides of the current collector. The active material-containing layer has a thickness of 20 to 200 μm per one side of the current collector, and diethyl carbonate permeates the active material-containing layer at a rate of 0.1 g/(cm$^2$·min) or higher. Further, the method for producing an electrode of the present invention includes the steps of: forming an electrode precursor by forming an active material-containing layer on one side or both sides of a current collector; and compressing the electrode precursor. In the electrode precursor forming step, the active material-containing layer is formed such that the active material-containing layer has a higher porosity in a portion close to the current collector then in other portions.

5 Claims, 1 Drawing Sheet

(51) Int. Cl.
*H01M 4/587* (2010.01)
*H01M 4/62* (2006.01)

(56) References Cited

U.S. PATENT DOCUMENTS

| | | |
|---|---|---|
| 2005/0130039 A1 | 6/2005 | Shimizu et al. |
| 2005/0271940 A1 | 12/2005 | Fukunaga et al. |
| 2006/0024579 A1* | 2/2006 | Kolosnitsyn et al. ......... 429/209 |
| 2008/0241696 A1 | 10/2008 | Hinoki et al. |
| 2008/0311476 A1 | 12/2008 | Katai et al. |

FOREIGN PATENT DOCUMENTS

| | | |
|---|---|---|
| JP | 2003-272611 A | 9/2003 |
| JP | 2006-24550 A | 1/2006 |
| JP | 2008-251401 A | 10/2008 |
| JP | 2010-9951 A | 1/2010 |
| JP | 2010-92622 A | 4/2010 |
| JP | 2010-118302 A | 5/2010 |
| JP | 2010-177152 A | 8/2010 |
| KR | 10-2007-0046126 A | 5/2007 |
| WO | WO2010130976 A1 * | 11/2010 |

OTHER PUBLICATIONS

English machine translation for JP-2010-9951-A, dated Jan. 14, 2010.
Korean Office Action, dated Jul. 12, 2013, for Korean Application No. 10-2012-0019624.

* cited by examiner

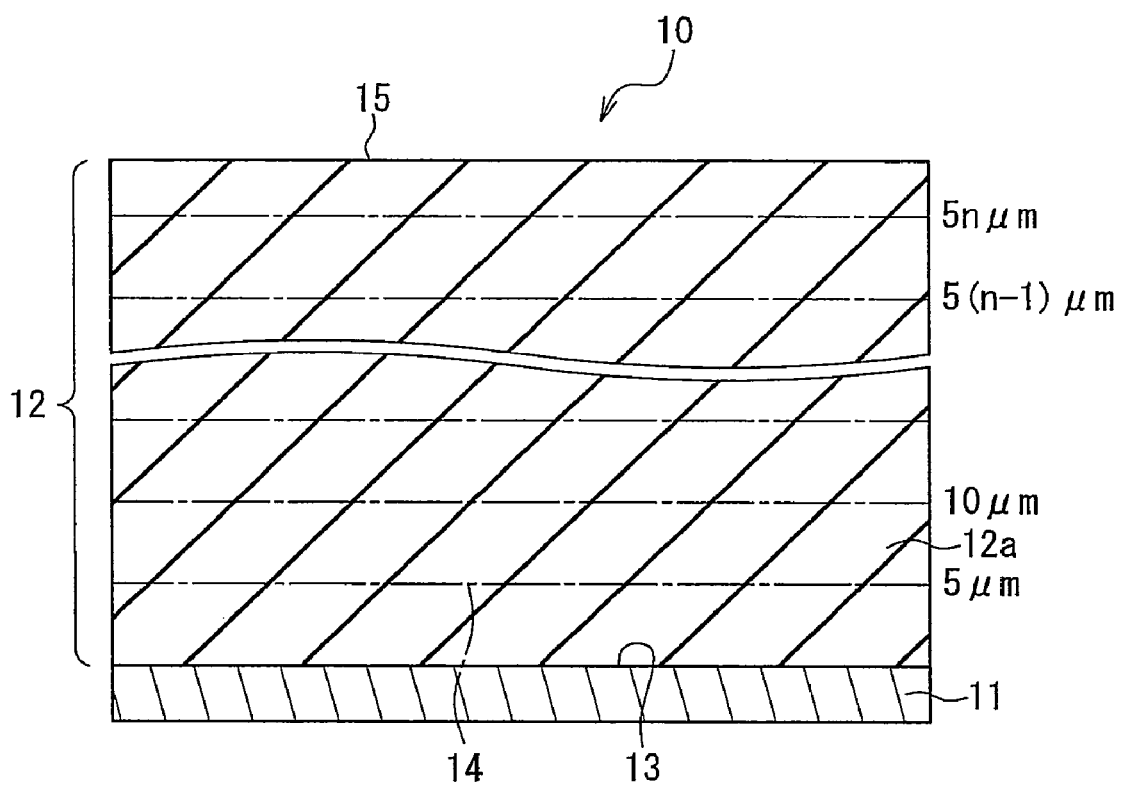

ELECTRODE AND METHOD FOR PRODUCING THE SAME

BACKGROUND OF THE INVENTION

1. Field of the Invention

The present invention relates to an electrode used in lithium-ion secondary batteries and the like and to a method for producing the electrode.

2. Description of Related Art

Nonaqueous electrolyte batteries typified by a lithium-ion secondary battery are characterized by their high energy density, and thus have been widely used as power sources for portable devices such as a portable telephone and a notebook personal computer. There is a trend toward a further increase in the capacity of lithium-ion secondary batteries as the portable devices have become more sophisticated. Hence, it is necessary to further increase their energy density.

As one of the means of increasing the energy density of a lithium-ion secondary battery, an active material-containing layer formed on one side or both sides of a current collector has been increased in thickness. However, an increase in the thickness of the active material-containing layer leads to an increase in the distance from the active material-containing layer to the current collector, which makes it difficult for an electrolyte to permeate into the vicinity of the current collector from the surface of the active material-containing layer, so that the charge-discharge characteristics may not be improved.

To solve this problem, JP 2008-251401 A, for example, proposes an electrode in which the active material particle size distribution in the lower portion of the active material-containing layer (i.e., the portion of the active material-containing layer close to the current collector) has a larger peak than that of the active material particle size distribution in the surface portion of the active material-containing layer (i.e., the portion of the active material-containing layer on the side opposite to the current collector) and the thickness of the lower portion makes up 50 to 90% of the total thickness of the surface portion and the lower portion.

In the electrode described in JP 2008-251401 A, while the electrolyte permeability improves in the surface portion of the active material-containing layer because the porosity of the surface portion increases, the electrolyte permeability tends to deteriorate in the lower portion of the active material-containing layer because the porosity of the lower portion declines contrary to the surface portion.

With the foregoing in mind, the present invention provides an electrode in which the active material-containing layer has improved electrolyte permeability in the lower portion.

SUMMARY OF THE INVENTION

The electrode of the present invention is an electrode including a current collector and an active material-containing layer formed on one side or both sides of the current collector. The active material-containing layer has a thickness of 20 to 200 μm per one side of the current collector, and diethyl carbonate permeates the active material-containing layer at a rate of 0.1 g/(cm$^2$·min) or higher.

The method for producing an electrode of the present invention includes the steps of: forming an electrode precursor by forming an active material-containing layer on one side or both sides of a current collector; and compressing the electrode precursor. When the surface of the current collector on which the active material-containing layer is formed is given as a first datum, the active material-containing layer is marked off every 5 μm from the first datum and divided into a plurality of segments separated by planes parallel to the first datum, and the plane parallel to and located 5 μm from the first datum is given as a second datum, the average porosity of the segment in a range of 5 to 10 μm from the first datum is given as Va %, and the highest of average porosities of the segments between the second datum and the surface of the active material-containing layer is given as Vm %, the active material-containing layer is formed in the electrode precursor forming step so that the following formulae (1) and (2) hold:

$$Va \geq 16\% \quad (1)$$

$$Va/Vm \geq 0.98 \quad (2).$$

According to the present invention, it is possible to provide an electrode in which the active material-containing layer has a high porosity and high electrolyte permeability in the lower portion.

BRIEF DESCRIPTION OF THE DRAWINGS

FIG. 1 is a schematic cross-sectional view of an exemplary electrode precursor used in the present invention.

DETAILED DESCRIPTION OF THE INVENTION

The electrode of the present invention includes a current collector and an active material-containing layer formed on one side or both sides of the current collector. The active material-containing layer has a thickness of 20 to 200 μm per one side of the current collector, and diethyl carbonate permeates the active material-containing layer at a rate of 0.1 g/(cm$^2$·min) or higher.

Further, the active material-containing layer is formed by compressing an electrode precursor. When the surface of the current collector on which the active material-containing layer is formed is given as a first datum, the active material-containing layer is marked off every 5 μm from the first datum and divided into a plurality of segments separated by planes parallel to the first datum, and the plane parallel to and located 5 μm from the first datum is given as a second datum, the average porosity of the segment in a range of 5 to 10 μm from the first datum is given as Va %, and the highest of average porosities of the segments between the second datum and the surface of the active material-containing layer is given as Vm %, the following formulae (1) and (2) hold in the electrode precursor:

$$Va \geq 16\% \quad (1)$$

$$Va/Vm \geq 0.98 \quad (2).$$

Further, the method for producing an electrode of the present invention includes the steps of: forming an electrode precursor by forming an active material-containing layer on one side or both sides of a current collector; and compressing the electrode precursor. When the surface of the current collector on which the active material-containing layer is formed is given as a first datum, the active material-containing layer is marked off every 5 μm from the first datum and divided into a plurality of segments separated by planes parallel to the first datum, and the plane parallel to and located 5 μm from the first datum is given as a second datum, the average porosity of the segment in a range of 5 to 10 μm from the first datum is given as Va %, and the highest of average porosities of the segments between the second datum and the surface of the active material-containing layer is given as Vm %, the active material-containing layer is formed in the electrode precursor forming step so that the following formulae (1) and (2) hold:

$$Va \geq 16\% \qquad (1)$$

$$Va/Vm \geq 0.98 \qquad (2).$$

As a result of satisfying the formulae (1) and (2), the active material-containing layer, which constitutes the electrode precursor, can have a higher porosity in a portion close to the surface of the current collector than in a portion close to its surface. Since the electrode precursor is pressurized and compressed in the end, voids in the active material-containing layer decrease as a whole. However, the electrode, which is produced by compressing the electrode precursor, has improved electrolyte permeability probably because the void distribution ratio in the electrode precursor remains even after the electrode precursor is compressed and made into the electrode. Thus, even if the active material-containing layer has a large thickness, i.e., a thickness of 20 to 200 μm per one side of the current collector, diethyl carbonate can permeate the active material-containing layer at a high rate, i.e., at a rate of 0.1 g/(cm$^2$·min) or higher.

In the present invention, the permeation rate of diethyl carbonate is determined by a method explained later in Examples. The reason for using diethyl carbonate in the present invention to determine the rate of permeation into the active material-containing layer is because diethyl carbonate is a typical electrolyte solvent used in lithium-ion secondary batteries.

The term "electrode precursor" as used herein refers to a product obtained by applying a paint for forming an active material-containing layer (described later) onto the surface of a current collector and drying the applied paint, and the product is in an uncompressed state (not been compressed yet). Even if the electrode precursor is compressed and made into the electrode, the electrolyte permeability of the electrode can be improved if the porosity of the electrode precursor prior to the compression is defined as in the above manner.

An upper limit to Va is preferably 36%. If Va exceeds 36%, the porosity of the active material-containing layer becomes too high in a portion close to the surface of the current collector, so that the adhesion between the active material-containing layer and the current collector tends to deteriorate. A lower limit to Va is more preferably 24%.

If Va/Vm is less than 0.98, the active material-containing layer cannot have the highest porosity in a portion close to the surface of the current collector. An upper limit to Va/Vm is 1.00, in other words when Va and Vm are equal (Va=Vm). Va and Vm become equal when Va becomes the highest of average porosities of the segments of the active material-containing layer. This is most preferable because the active material-containing layer can have the highest porosity in a portion close to the surface of the current collector.

The present invention does not require the porosity of the 5 μm segment between the first and second datums (the segment facing the surface of the current collector). The reason for this is as follows. When, of constituent particles of the active-material containing layer, those having a relatively large size are disposed on the surface of the current collector, it is less likely that smaller particles enter from the current collector side and fill the gap between the larger particles, so that voids are fixed in the drying process. Consequently, the active material-containing layer tends have a higher porosity in the portion facing the surface of the current collector than in other portions.

Next, an exemplary electrode precursor used in the present invention will be described with reference to the drawings. FIG. 1 is a schematic cross-sectional view of the exemplary electrode precursor used in the present invention. In the electrode precursor 10, an active material-containing layer 12 is formed on one side of a current collector 11, as shown in FIG. 1. Here, when the surface of the current collector 11 is given as a first datum 13, the active material-containing layer 12 is marked off every 5 μm from the first datum 13 and divided into n segments separated by planes parallel to the first datum 13, and the plane parallel to and located 5 μm from the first datum 13 is given as a second datum 14, the average porosity of the segment 12a in a range of 5 to 10 μm from the first datum 13 is given as Va %, and the highest of average porosities of the segments between the second datum 14 and the surface 15 of the active material-containing layer 12 is given as Vm %, the following formulae (3) and (4) hold in the electrode precursor:

$$36\% \geq Va \geq 16\% \qquad (3)$$

$$1.00 \geq Va/Vm \geq 0.98 \qquad (4).$$

In the present invention, Va and Vm are determined as follows. First, a paint for forming an active material-containing layer is applied to the current collector 11, and the applied paint is dried to form the active material-containing layer 12. Next, the active material-containing layer 12 formed is subjected to ion milling to prepare a sample piece used for cross-sectional observation. Subsequently, the cross section of the sample piece is observed under 1000× magnification using a scanning electron microscope (SEM) to obtain cross sectional SEM images of 10 areas. Then, the cross sectional SEM images are binarized to extract void portions using image analysis software, for example, "A-ZO Kun®" available from Asahi Kasei Engineering Corporation. Next, the active material-containing layer 12 is marked off every 5 μm from the first datum 13 and divided into n segments separated by planes parallel to the first datum 13, and the percentage of area of void portions in each segment is calculated. The cross sectional SEM images of 10 areas are analyzed in the same manner to determine an average porosity of each segment, and the average porosity of the segment 12a in a range of 5 to 10 μm from the first datum 13 is given as Va %, and the highest of average porosities of the segments between the second datum 14 and the surface 15 of the active material-containing layer 12 is given as Vm %.

The electrode precursor can be used as either a positive electrode precursor or negative electrode precursor.

The positive electrode precursor is produced as follows. A paint for forming a positive electrode active material-containing layer, which is obtained by adding a solvent to a mixture containing a positive electrode active material, a positive electrode conductive assistant, a positive electrode binder and the like, and kneading the resultant mixture adequately, is applied to one side or both sides of a positive electrode current collector (one side in FIG. 1), followed by drying of the applied paint.

For the positive electrode active material, lithium-containing composite metal oxides are preferable because they are suited for increasing the capacity. Preferred examples of such lithium-containing composite metal oxides include lithium cobalt oxides such as $LiCO_2$, lithium manganese oxides such as $LiMnO_2$ and $LiMn_2O_4$, lithium nickel oxides such as $LiNiO_2$, and lithium-containing composite metal oxides represented by $Li_xMO_2$ (where M represents two or more elements of Ni, Mn, Co and Al and x satisfies 0.9<x<1.2).

The positive electrode conductive assistant may be added as needed for the purpose of, for example, improving the conductivity of the positive electrode active material-containing layer. For example, carbon powders such as carbon black, ketjen black, acetylene black and graphite can be used as a conductive powder which serves as the conductive assistant.

For the positive electrode binder, cellulose ester compounds, rubber binders and the like can be used, for example. Specific examples of cellulose ester compounds include carboxymethyl cellulose (CMC), carboxyethyl cellulose, hydroxyethyl cellulose and ammonium salts and alkali metal salts thereof such as lithium salt, sodium salt and potassium salt thereof. Specific examples of rubber binders include: styrene conjugated diene copolymers such as styrene butadiene rubber (SBR); nitryl conjugated diene copolymer rubbers such as nitryl butadiene rubber (NBR); silicone rubbers such as polyorganosiloxane; acrylic rubbers obtained by polymerization of acrylic alkyl ester, or by copolymerization of acrylic alkyl ester, ethylenically unsaturated carboxylic acid and/or other ethylenically unsaturated monomer; and fluoro rubbers such as vinylidene fluoride copolymer rubber.

For the composition of the paint for forming a positive electrode active material-containing layer (except the solvent), it is desirable that the positive electrode active material content is 90 mass % or more, and more preferably 92 mass % or more and is 99 mass % or less, and more preferably 98 mass % or less. Further, it is desirable that the positive electrode conductive assistant content is 0.1 mass % or more, and more preferably 0.5 mass % or more, and is 5 mass % or less, and more preferably 2 mass % or less. If the conductive assistant content is too small, the conductivity of the positive electrode active material-containing layer cannot be ensured, so that the load characteristics of the battery deteriorate. On the other hand, too large conductive assistant content causes a decline in the amount of active material, so that the battery capacity may decline. Further, it is desirable that the positive electrode binder content is 0.5 mass % or more, and more preferably 1 mass % or more, and is 8 mass % or less, and more preferably 3 mass % or less. If the binder content is too small, the adhesion between the current collector and the positive electrode active material-containing layer may deteriorate and the strength of the positive electrode active material-containing layer may drop. On the other hand, too large binder content causes a decline in the amount of active material, so that the battery capacity may decline.

For the solvent, water or an organic solvent such as N-methyl-2-pyrolidone (NMP) can be used, for example.

The positive electrode current collector is not particularly limited as long as an electronic conductor substantially having chemical stability in the battery configured is used. For example, an aluminum foil having a thickness of 10 to 30 μm can be used for the positive electrode current collector.

The negative electrode precursor is produced as follows. A paint for forming a negative electrode active material-containing layer, which is obtained by adding a solvent to a mixture containing a negative electrode active material, a negative electrode binder and if required a negative electrode conductive assistant and the like, and kneading the resultant mixture adequately, is applied to one side or both sides of a negative electrode current collector (one side in FIG. 1), followed by drying of the applied paint.

For the negative electrode active material, carbon materials capable of intercalating/deintercalating lithium, such as graphite, pyrolytic carbons, cokes, glassy carbons, calcined organic polymer compounds, mesocarbon microbeads (MCMB) and carbon fibers can be used individually or in combination of two or more.

For the negative electrode conductive assistant, the negative electrode binder and the solvent, those used for the positive electrode can be used. However, for the negative electrode binder, it is particularly preferable to use a combination of a cellulose ester compound and a rubber binder, in particular CMC and butadiene copolymer rubber such as SBR or NBR. This is because a cellulose ester compound such as CMC mainly provides a thickening effect on the paint for forming a negative electrode active material-containing layer and a rubber binder such as SBR provides a bonding effect on the negative electrode material. When using a cellulose ester compound such as CMC and a rubber binder such as SBR in combination as in this case, the mass ratio of the cellulose ester compound to the rubber binder is preferably 1:1 to 1:15.

For the composition of the paint for forming a negative electrode active material-containing layer (except the solvent), it is desirable that the negative electrode active material content is 90 mass % or more, and more preferably 95 mass % or more, and is 99 mass % or less, and more preferably 98 mass % or less. If the negative electrode active material content is too small, the battery capacity may decline. On the other hand, if the negative electrode active material content is too large, the adhesion between the current collector and the negative electrode active material-containing layer may deteriorate and the strength of the negative electrode active material-containing layer may drop. Further, it is desirable that the negative electrode binder content is 1 mass % or more, and more preferably to 1.5 mass % or more, and is 10 mass % or less, and more preferably 6 mass % or less. If the binder content is too small, the adhesion between the current collector and the negative electrode active material-containing layer may deteriorate and the strength of the negative electrode active material-containing layer may drop. On the other hand, if the binder content is too large, the percentage of the active material declines, so that the battery capacity may drop. A combination of two or more negative electrode active materials and a combination of two or more binders may be used. Further, a conductive assistant and a filler may also be added.

The negative electrode current collector is not particularly limited as long as an electronic conductor substantially having chemical stability in the battery configured is used. For example, a copper foil having a thickness of 5 to 20 μm can be used for the negative electrode current collector.

The way to apply the paint for forming a positive electrode active material-containing layer and the paint for forming a negative electrode active material-containing layer to current collectors is not particularly limited, and an applicator such as a gravure coater, knife coater, reverse roll coater or die coater may be used to apply the paints.

After the application of the paint to the current collector, it is preferable to adopt a drying method in which the coating is heated internally (hereinafter also referred to as the internal drying method). If the coating is heated internally to be dried, it is possible to eliminate drying unevenness and to dry the coating in a shorter time, so that partial agglomeration of the active material and the binder can be prevented. Consequently, the active material-containing layer, which constitutes the electrode precursor, can have a higher porosity in a portion close to the surface of the current collector than in a portion close to its surface. Further, the drying time can be reduced and the productivity can also be improved by the internal drying method.

The internal drying method is not particularly limited as long as the coating can be dried internally without raising the surface temperature of the coating. For example, an infrared heater or hotplate may be used to dry the coating internally. In particular, it is preferable to use an infrared heater when drying the coating from the opposite side to the current collector and it is preferable to use a hotplate when drying the coating from the current collector side.

For the heating element of the infrared heater, it is preferable to use a filament-type heating element. That is, when a coating is dried in a dryer by the circulation of hot air, the coating can be dried immediately around its surface. However, since it takes long time for the heat to reach the inside of the coating, the drying takes long time. As a result, the resin contracts significantly in a portion of the coating close to the current collector as the coating is dried, resulting in fewer voids. This tendency becomes more remarkable as the coating has a larger thickness. By the way, water, NMP or the like used as the solvent for the paint for forming an active material-containing layer has the property of absorbing infrared. Thus, by using a heating element that radiates infrared, the coating can be heated internally, allowing faster drying of the coating. Conventionally, a heating element typified by a ceramic heater was commonly used as an infrared-radiating heating element but the amount of infrared radiated by the heating element was insufficient, thereby resulting in a long drying time. As a result, the desired productivity could not be achieved. However, it has been found that if a filament-type heating element, which generates heat by making a filament red hot, is used as a heating element that radiates more powerful infrared for reducing the drying time, a coating having many inner voids, particularly in a portion close to the surface of the current collector (lower portion) can be produced. Thus, by drying the coating from the surface using an infrared heater equipped with a filament-type heating element, the active material-containing layer can have a higher porosity in a portion close to the surface of the current collector than in a portion close to its surface.

When drying the coating using a hotplate, the coating is dried by bringing the current collector into direct contact with the heating surface of the hotplate. So this method is suited when the active material-containing layer is provided only on one side of the current collector. By bringing the current collector into direct contact with the heating surface of the hotplate to dry the coating from the current collector side, the active material-containing layer can have a higher porosity in a portion close to the surface of the current collector than in a portion close to its surface.

The electrode (positive or negative electrode) of the present invention is obtained by compressing the above-described electrode precursor. As described above, the electrode precursor in which the active material-containing layer has a higher porosity in a portion close to the surface of the current collector than in a portion close to its surface is compressed and made into the electrode. Consequently, the electrode has high void continuity in a portion close to the surface of the current collector and thus improved electrolyte permeability. This is probably because the porosity distribution ratio in the electrode precursor still remains even after the electrode precursor is compressed and made into the electrode. For this reason, not only can the productivity of the battery be improved but also the performance of the battery can be enhanced as lithium ions can move and disperse more smoothly. Specifically, the rate at which diethyl carbonate permeates the active material-containing layer can be increased to 0.1 g/(cm$^2$·min) or higher.

The conditions under which the electrode precursor is compressed are not particularly limited. For example, the electrode precursor may be compressed such that the active material-containing layer is controlled to have a certain thickness and a certain electrode density using, for example, a roll compressor.

It is desirable that the positive electrode active material-containing layer has a density of 2.0 g/cm$^3$ or more, and more preferably 2.2 g/cm$^3$ or more, and has a density of 3.8 g/cm$^3$ or less, more preferably 3.6 g/cm$^3$ or less, still more preferably 3.2 g/cm$^3$ or less, and most preferably 3.0 g/cm$^3$ or less. Further, it is desirable that the negative electrode active material-containing layer has a density of 1.2 g/cm$^3$ or more, more preferably 1.4 g/cm$^3$ or more, and has a density of 1.9 g/cm$^3$ or less, and more preferably 1.8 g/cm$^3$ or less. If the density of the active material-containing layer is too small, the active material-containing layer makes up a large proportion of the battery space due to its thickness, so that the battery capacity tends to drop. On the other hand, if the density of the active material-containing layer is too large, the battery capacity tends to decline due to collapse of the active material. Moreover, wettability to an electrolyte tends to deteriorate.

In the present invention, the density of the active material-containing layer is determined by the method explained later in Examples.

Hereinafter, the present invention will be described by way of Examples. In should be noted that the present invention is not limited to the following examples.

Example 1

A carboxymethyl cellulose aqueous solution and a suspension in which styrene butadiene copolymer rubber was dispersed were each prepared as binders such that each would have 1 part by mass of solids (i.e., a total of 2 parts by mass of solids as the binders). These binders were mixed with 98 parts by mass of natural graphite to prepare a paint for forming a negative electrode active material-containing layer. To one side of a copper foil having a thickness of 10 μm the paint was applied uniformly while adjusting an applicator such that the coating would have a thickness of about 55 μm after being dried. Thereafter, the copper foil to which the paint had been applied was fixed onto the stage in a dryer, and an infrared heater equipped with a filament-type heating element was placed 15 cm above the copper foil. The output of the infrared heater was set to 0.8 kW and the copper foil was dried from the coating side, thus obtaining a negative electrode precursor. The mass of the stage in the dryer was measured, and the drying was continued until no change was seen in the mass. The drying time was defined as the time from start to finish of the drying. The drying time was 82 seconds.

Subsequently, the negative electrode precursor produced was compressed by a roll press, thus producing a negative electrode having a total thickness of 54 μm.

Example 2

A negative electrode having a total thickness of 57 μm was produced in the same manner as in Example 1 except that the output of the infrared heater was set to 1.5 kW to dry the coating. The drying time was 50 seconds.

Example 3

A negative electrode having a total thickness of 111 μm was produced in the same manner as in Example 1 except that the paint for forming a negative electrode active material-containing layer was applied such that the coating would have a thickness of about 110 μm after being dried, and the output of the infrared heater was set to 1.5 kW to dry the coating. The drying time was 90 seconds.

Example 4

A negative electrode having a total thickness of 117 μm was produced in the same manner as in Example 1 except that the paint for forming a negative electrode active material-containing layer was applied such that the coating would have a thickness of about 110 μm after being dried, and the output of the infrared heater was set to 1.8 kW to dry the coating. The drying time was 45 seconds.

Example 5

A negative electrode having a total thickness of 56 μm was produced in the same manner as in Example 1 except that a copper foil to which the paint had been applied was brought into intimate contact with a hotplate at 120° C. to dry the coating from the copper foil side. The mass of the hotplate was measured, and the drying was continued until no change was seen in the mass. The drying time was defined as the time from start to finish of the drying. The drying time was 73 seconds.

Comparative Example 1

A negative electrode having a total thickness of 52 μm was produced in the same manner as in Example 1 except that the output of the infrared heater was set to 0.4 kW to dry the coating. The drying time was 103 seconds.

Comparative Example 2

A negative electrode having a total thickness of 107 μm was produced in the same manner as in Example 1 except that the paint for forming a negative electrode active material-containing layer was applied such that the coating would have a thickness of about 110 μm after being dried, and the output of the infrared heater was set to 0.8 kW to dry the coating. The drying time was 152 seconds.

Comparative Example 3

A negative electrode having a total thickness of 60 μm was produced in the same manner as in Example 1 except that the coating was dried by applying 80° C. hot air to the coating without using the infrared heater or the hotplate. The drying time was 76 seconds.

Next, Va, Vm and the coating density were determined in the following manner using the negative electrodes of Examples 1 to 5 and Comparative Examples 1 to 3, and the electrolyte permeation rate in each negative electrode was determined.

<Determination of Va and Vm>

The coating (negative electrode active material-containing layer) of each negative electrode produced was subjected to ion milling to prepare a sample piece used for cross-sectional observation. Next, the cross-section of the sample piece was observed under 1000× magnification using a scanning electron microscope (SEM) to obtain cross sectional SEM images of 10 areas. Subsequently, the cross sectional SEM images were binarized to extract void portions using the image analysis software "A-ZO Kun®" available from Asahi Kasei Engineering Corporation. Subsequently, the active material-containing layer was marked off every 5 μm from the first datum (the surface of the current collector) and divided into segments separated by planes parallel to the first datum, and the area of void portions in each segment was calculated. An average porosity of each segment was determined from the obtained area, and the average porosity of the segment in a range of 5 to 10 μm from the first datum was determined as Va %. Further, the highest of average porosities of the segments between the second datum (the plane parallel to and located 5 μm from the first datum) and the surface of the active material-containing layer was determined as Vm %.

<Determination of Coating Density>

The coating density was determined as an apparent density from the mass and volume of the coating of each negative electrode.

<Determination of Electrolyte Permeation Rate>

Diethyl carbonate was prepared as an electrolyte, and a 5 cm×5 cm piece cut from each electrode was prepared as a measuring sample. Next, the electrolyte was poured into a petri dish, and the measuring sample was hung vertically and its lower end was immersed into the surface of the electrolyte. At the same instant, the electrolyte permeated the coating. A decrease in the mass of the petri dish was measured using a precision balance every 1 minute from the beginning of the immersion. Next, in view of the impact of differences in coating thickness on the permeation rate, the coating thickness was additionally measured using a dial gauge and the permeation rate per unit cross section of the coating was determined.

Table 1 provides the results.

TABLE 1

|  | Drying method | Output (kW) | Thickness of negative electrode (μm) | Drying time (sec) | Va (%) | Vm (%) | Va/Vm | Coating density (g/cm³) | Permeation rate [g/(cm²·min)] |
|---|---|---|---|---|---|---|---|---|---|
| Ex. 1 | Infrared | 0.8 | 54 | 82 | 24.2 | 24.8 | 0.98 | 1.6 | 0.103 |
| Ex. 2 | Infrared | 1.5 | 57 | 50 | 24.6 | 24.6 | 1.00 | 1.6 | 0.121 |
| Ex. 3 | Infrared | 1.5 | 111 | 90 | 23.7 | 23.7 | 1.00 | 1.6 | 0.116 |
| Ex. 4 | Infrared | 1.8 | 117 | 45 | 25.0 | 25.0 | 1.00 | 1.6 | 0.118 |
| Ex. 5 | Hotplate | — | 56 | 73 | 24.0 | 24.0 | 1.00 | 1.6 | 0.108 |
| Comp. Ex. 1 | Infrared | 0.4 | 52 | 103 | 20.3 | 21.1 | 0.96 | 1.6 | 0.097 |
| Comp. Ex. 2 | Infrared | 0.8 | 107 | 152 | 17.6 | 20.6 | 0.85 | 1.6 | 0.097 |
| Comp. Ex. 3 | Hot air | — | 60 | 76 | 15.7 | 20.6 | 0.76 | 1.5 | 0.095 |

As can be seen from Table 1, the electrodes of Examples 1 to 5 and Comparative Examples 1 to 3 had substantially the same amount of voids in their coating because the coating density was substantially the same through out Examples 1 to 5 and Comparative Examples 1 to 3.

However, the permeation rate was 0.1 g/(cm²·min) or higher in all of Examples 1 to 5 in which Va and Vm satisfied Va≥16% and Va/Vm≥0.98. This shows that the permeation rate in Examples 1 to 5 was higher than that in Comparative Examples 1 to 3. The reason for this can be considered as follows. In Examples 1 to 5, the negative electrode active material-containing layer already had a higher porosity in a portion close to the surface of the current collector than in a portion close to its surface in a negative electrode precursor state, i.e., prior to the compression, so that an improvement in the continuity of voids in the coating after the compression resulted in an improvement in the electrolyte permeability. This was probably because the void distribution ratio in the negative electrode precursor remained even after the negative electrode precursor was compressed and made into the negative electrode.

On the other hand, for Comparative Example 1 in which the negative electrode had substantially the same thickness as that of the negative electrode in Example 1 and the output of the infrared heater was half of that in Example 1 and Comparative Example 2 in which the negative electrode had a thickness about twice as large as the thickness of the negative electrode in Example 1 and the output of the infrared heater was the same as that in Example 1, an improvement in Va was seen but Va/Vm was below 0.98. Thus, it is believed that the electrolyte permeation rate did not improve so much. Further, for Comparative Example 3 in which the coating was dried using hot air, the electrolyte permeation rate was small because Va was small and Va/Vm was below 0.98.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing an electrode consisting of an active material-containing single layer, comprising the steps of:

forming an electrode precursor including an active material-containing layer by uniformly applying a paint for forming an active material-containing layer once to one side or both sides of a current collector so that an active material-containing single precursor layer having a uniform porosity is formed on one side or both sides of the current collector, and then drying the active material-containing single precursor layer internally with an infrared heater including a filament-type heating element; and compressing the electrode precursor, wherein when the surface of the current collector on which the active material-containing single layer is formed is given as a first datum, the active material-containing single layer is marked off every 5 µm from the first datum by planes parallel to the first datum, and the plane parallel to and located 5 µm from the first datum is given as a second datum, the average porosity of a part of the active material-containing single layer located 5 to 10 µm from the first datum is given as Va %, and the highest of average porosities measured every 5 µm range between the second datum and the surface of the active material-containing single layer not opposing the current collector is given as Vm %, the active material-containing single layer is formed in the electrode precursor forming step so that the following formulae (1) and (2) hold:

$$Va \geq 16\% \tag{1}$$

$$Va/Vm \geq 0.98 \tag{2}.$$

2. The method according to claim 1, wherein the following formulae (3) and (4) hold:

$$36\% \geq Va \geq 16\% \tag{3}$$

$$1.00 \geq Va/Vm \geq 0.98 \tag{4}.$$

3. The method according to claim 1, wherein the active material-containing single layer has a thickness of 20 to 200 um per one side of the current collector in the compression step.

4. The method according to claim 1, wherein when the active material-containing single layer is a positive electrode active material-containing layer, the positive electrode active material-containing layer has a density of 2.0 to 3.8 g/cm$^3$ in the compression step.

5. The method according to claim 1, wherein when the active material-containing single layer is a negative electrode active material-containing layer, the negative electrode active material-containing layer has a density of 1.2 to 1.9 g/cm$^3$ in the compression step.

* * * * *